United States Patent
Jensen et al.

(10) Patent No.: US 11,796,414 B2
(45) Date of Patent: *Oct. 24, 2023

(54) DETERMINING VEHICLE LOAD CENTER OF MASS

(71) Applicant: UATC, LLC, San Francisco, CA (US)

(72) Inventors: Kenneth James Jensen, Alameda, CA (US); Edward Henry Lim, Pacifica, CA (US)

(73) Assignee: UATC, LLC, San Francisco, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/446,683

(22) Filed: Sep. 1, 2021

(65) Prior Publication Data

US 2021/0396620 A1    Dec. 23, 2021

Related U.S. Application Data

(63) Continuation of application No. 16/153,298, filed on Oct. 5, 2018, now Pat. No. 11,125,640.

(Continued)

(51) Int. Cl.
  *G01M 1/12* (2006.01)
  *B60Q 9/00* (2006.01)
  (Continued)

(52) U.S. Cl.
  CPC ............. *G01M 1/122* (2013.01); *B60Q 9/00* (2013.01); *B60T 7/12* (2013.01); *B60T 8/17* (2013.01);
  (Continued)

(58) Field of Classification Search
  CPC . G01M 1/122; B60Q 9/00; B60T 7/12; B60T 8/17; B60T 8/1708; B60T 8/171;
  (Continued)

(56) References Cited

U.S. PATENT DOCUMENTS 1,125,640 A * 1/1915 Bernard .................. G07F 17/38
  368/3
5,920,128 A * 7/1999 Hines .................... B60T 8/1708
  340/12.32

(Continued)

OTHER PUBLICATIONS

"U.S. Appl. No. 16/153,298, Notice of Allowance dated May 18, 2021", 8 pgs.

*Primary Examiner* — Gertrude Arthur Jeanglaude
(74) *Attorney, Agent, or Firm* — SCHWEGMAN LUNDBERG & WOESSNER, P.A.

(57) ABSTRACT

Various examples are directed to systems and methods for operating a vehicle comprising a tractor and a trailer attached for pulling behind the tractor. A center-of-mass system may determine a mass of the trailer and a tractor understeer. The center-of-mass system may determine the tractor understeer using steering input data describing a steering angle of the tractor and yaw data describing a yaw of the tractor. The center-of-mass system may determine a load center of mass using the tractor understeer and a mass of the trailer. The center-of-mass system may further determine that the load center of mass transgresses a center-of-mass threshold and send an alert message indicating that the load transgresses the load center-of-mass threshold.

20 Claims, 8 Drawing Sheets

Related U.S. Application Data

(60) Provisional application No. 62/644,946, filed on Mar. 19, 2018.

(51) Int. Cl.
| | |
|---|---|
| *B60T 8/17* | (2006.01) |
| *B60T 7/12* | (2006.01) |
| *B60T 8/32* | (2006.01) |
| *B60T 8/171* | (2006.01) |
| *G01G 19/02* | (2006.01) |
| *B60T 8/18* | (2006.01) |

(52) U.S. Cl.
CPC ............ *B60T 8/171* (2013.01); *B60T 8/1708* (2013.01); *B60T 8/3205* (2013.01); *B60T 8/18* (2013.01); *B60T 2230/06* (2013.01); *B60T 2250/00* (2013.01); *B60T 2250/02* (2013.01); *B60T 2250/03* (2013.01); *G01G 19/02* (2013.01)

(58) Field of Classification Search
CPC ...... B60T 8/3205; B60T 8/18; B60T 2230/06; B60T 2250/00; B60T 2250/02; B60T 2250/03; G01G 19/02
See application file for complete search history.

(56) References Cited

U.S. PATENT DOCUMENTS

| | | | |
|---|---|---|---|
| 9,120,359 B2 | 9/2015 | Chiu et al. | |
| 9,824,506 B2 * | 11/2017 | Zula | G07C 5/00 |
| 2015/0094911 A1 | 4/2015 | Munnix | |
| 2019/0285501 A1 | 9/2019 | Jensen et al. | |

* cited by examiner

DETERMINING VEHICLE LOAD CENTER OF MASS

CLAIM FOR PRIORITY

This application is a continuation of and claims the benefit of priority of U.S. application Ser. No. 16/153,298, filed Oct. 5, 2018, which claims the benefit of priority of U.S. Provisional Application No. 62/644,946, filed Mar. 19, 2018, each of which is hereby incorporated by reference in its entirety.

FIELD

The document pertains generally, but not by way of limitation, to devices, systems, and methods for operating an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on to the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
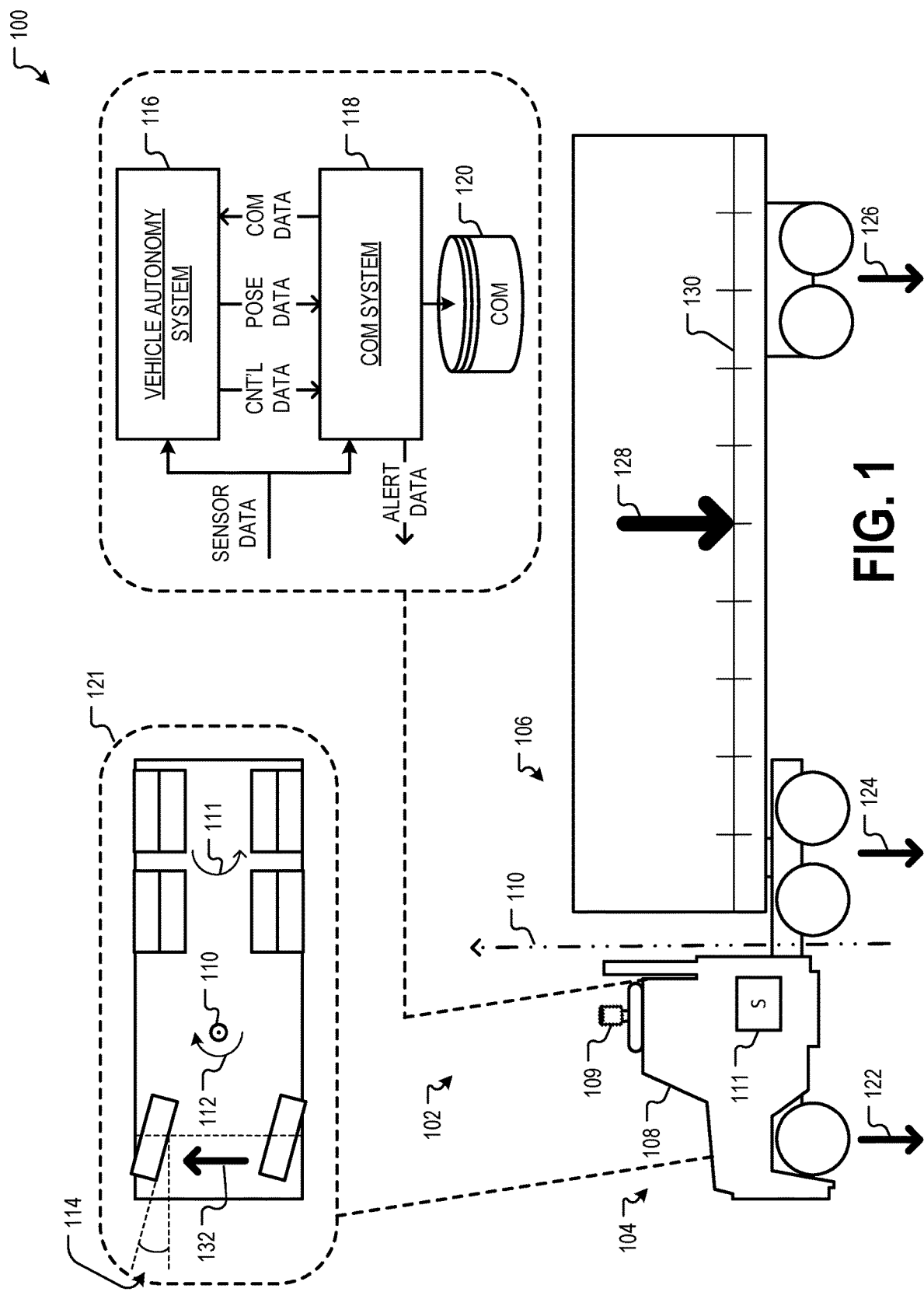
FIG. 1 is a diagram showing one example of an environment for determining and using load center of mass of a vehicle.

Examples described herein are directed to systems and methods for determining and/or using the center of mass of a vehicle load, for example, in an autonomous vehicle.

Tractor trailer vehicles include a tractor and a trailer. The vehicle's load is positioned in the trailer. In some examples, it is desirable to load a trailer in a manner that keeps a load center of mass inside of a target center-of-mass range. For example, if the load center of mass is too close to the rear of the trailer, it can cause the vehicle to be unstable on the road. Also, due to regulations and/or vehicle design, it is often undesirable to place too much load on any given axle of the trailer and/or of the tractor. A trailer that is not overloaded may, nonetheless, place too much load on an axle of the trailer and/or of the tractor if the load center of mass is too close to the rear or to the front of the trailer. There may be loading constraints based on the lateral positioning (e.g., side-to-side positioning) of the center of mass. For the sake of simplicity, various examples are described herein in the context of longitudinal positioning (e.g., front-to-back positioning) of the load or center of mass. It will however be appreciated that the disclosure contemplates embodiments including lateral positioning systems in combination with, or in alternative to, longitudinal positioning.

Various examples described herein are directed to center-of-mass systems and methods for determining the load center of mass of a trailer using the manner in which the vehicle responds to control inputs. A center-of-mass system, as described herein, may be used with a manually controlled tractor trailer vehicle, and/or an autonomous or semi-autonomous tractor trailer vehicle. In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input.

A center-of-mass system, as described herein, may work in conjunction with a vehicle autonomy system to determine the load center of mass and/or to bring about changes in the operation of the vehicle in response to detecting that the load center of mass transgresses a center-of-mass threshold, for example, as described herein.

The center-of-mass system, in an example embodiment, finds the load center of mass based on the measured understeer and the load mass. Understeer describes how the tractor responds to steering input. For example, as understeer increases, more steering angle is needed, relative to an unloaded configuration, to bring about a desired change in vehicle yaw. From the understeer, the center-of-mass system determines the force on the rear axle or axles of the tractor (the tractor rear axle force), as described herein. The center-of-mass system considers the contribution to the tractor rear axle force from the tractor's own mass to determine a portion of rear axle force contributed by the trailer. The center-of-mass system determines the load center of mass from the total mass of the trailer and the contribution of the trailer to the tractor rear axle force. In various examples, the center-of-mass system determines the load center of mass in this way without the need to add sensors or otherwise modify the trailer.

The center-of-mass system (and/or other vehicle systems) can respond to load center-of-mass values in various different ways. In some examples, the center-of-mass system stores data values indicative of center-of-mass values to a center-of-mass log for later retrieval and analysis. In some examples, the center-of-mass system transmits some or all of the determined center-of-mass values to a host system, which may monitor the load center of mass for the vehicle and/or for multiple vehicles.

In some examples, the center-of-mass system detects anomalies in the load center of mass and, when an anomaly is detected, takes a remedial action. For instance, an anomaly occurs, in an example, when the load center of mass transgresses a center-of-mass threshold. If the load center of mass transgresses a center-of-mass threshold, it may indicate a problem with the vehicle such as, for example, an improperly loaded trailer, a shifting of the load from its original position, and/or, in some examples, theft or other unauthorized removal of some or all of the load.

There are a number of ways that the load center of mass can transgress a center-of-mass threshold. In some examples, the load center of mass transgresses a center-of-mass threshold if it is within a front threshold distance of a front of the trailer. In some examples, the load center of mass transgresses a center-of-mass threshold if it is within a rear threshold distance of a rear of the trailer. Also, in some examples, the load center of mass transgresses a center-of-mass threshold if a difference between the load center of mass and a previous load center of mass is greater than a change threshold. This may indicate that the trailer load has shifted and/or that some of the load has been removed or added. Further, in some examples, the load center of mass transgresses a center-of-mass threshold if it results in more than an axle threshold weight on any of the axles of the trailer and/or the tractor. A center-of-mass threshold need not be based on separate thresholds for the front, rear, side walls, axles, previous load center of mass, etc. For example, the center-of-mass threshold can be based on any combination of distances to the front, rear, and side walls or a distance from a fixed location (e.g., distance from the geometric center of the trailer).

In some examples, the load center of mass described herein is a loaded trailer center of mass that describes a combination of the trailer and the load present on the trailer. Also, in some examples, load center of mass refers to a trailer-independent center of mass that describes the load independent of the trailer itself. For example, the center-of-mass system may use a known weight and/or center-of-mass of the trailer to derive the trailer-independent center of mass. Center-of-mass thresholds may be used in a form that corresponds to the type of load center of mass used. For example, a load center of mass that describes a combination of the trailer and the load may be compared to center-of-mass thresholds that are also expressed in terms of the trailer and the load. A load center of mass that describes the load independent of the trailer may be compared to center-of-mass thresholds that are also expressed in terms of the load itself, independent of the trailer.

Various remedial actions can be taken in response to a load center-of-mass anomaly. In some examples, the remedial actions include sending an alert message indicating that the load center-of-mass anomaly. The alert message may be sent, for example, by the center-of-mass system, to an output device of the cab of the tractor (e.g., by illuminating a light, sounding a buzzer or other speaker, etc.). The alert message may prompt the driver or other user to take over driving, further investigate the load and remedy any problems that may exist, etc. Also, in some examples, the alert message is sent to a host system. The host system may log the alert and/or initiate further remedial actions, such as triggering an inspection of the vehicle by a driver or other personnel.

In some examples, where the vehicle includes a vehicle autonomy system, remedial actions taken by the center-of-mass system and/or vehicle autonomy system in response to a load center-of-mass anomaly include generating one or more control inputs. For example, the vehicle autonomy system may cause the vehicle to make a safe stop (e.g., by pulling to the side of the roadway). Also, in some examples, the vehicle autonomy system causes the vehicle to proceed in a conservative operation mode or to enter a "limp home mode," where the vehicle proceeds at reduced speed towards a safe location where the trailer can be inspected and reloaded, if necessary.

In an example embodiment, the vehicle autonomy system can determine a shift in the load center of mass and determine a condition that may have caused the shift, such as aggressive cornering or accelerations indicative of a pothole. The system can mark the event that may have caused the shift in load and then communicate data to other vehicles (e.g., other AVs) to avoid the event (such as, for example, avoiding a particular lane at a particular location or reducing the maximum allowable speed for a particular corner).

In an example embodiment, the vehicle autonomy system adjusts one or more parameters of the vehicle autonomy system in accordance with the center-of-mass calculations. This can be advantageous because the parameters of the vehicle autonomy system may have been selected based on a nominal loading configuration. The vehicle autonomy system may provide satisfactory operation when the vehicle is loaded within a range of the nominal loading configuration. The center-of-mass system can facilitate improved performance outside of this range.

FIG. 1 is a diagram showing one example of an environment 100 for determining and using load center of mass. The environment 100 includes a vehicle 102 including a center-of-mass system 118. In the example of FIG. 1, the vehicle 102 is a tractor-trailer including a tractor 104 and a trailer 106. The vehicle 102 also includes a cab 108 at the tractor 104. A driver or other user (when present) is positioned in the cab 108.

In some examples, the vehicle 102 is an AV. A vehicle autonomy system 116 is configured to operate some or all of the controls of the vehicle 102 (e.g., acceleration, braking, steering). In some examples, the center-of-mass system 118 is a component of the vehicle autonomy system 116. The vehicle autonomy system 116, in some examples, is operable in different modes in which the vehicle autonomy system 116 has differing levels of control over the vehicle 102. For example, in a full autonomous mode, the vehicle autonomy system 116 assumes responsibility for all or most of the controls of the vehicle 102. In a semi-autonomous mode, the user is responsible for some or all control of the vehicle 102. Additional details of an example vehicle autonomy system 116 are provided in FIG. 2.

The vehicle 102 has one or more remote-detection sensors 109 that receive return signals from the environment 100. Return signals may be reflected from objects in the environment 100, such as the ground, buildings, trees, etc. The remote-detection sensors 109 may include one or more active sensors, such as light detection and ranging (LIDAR), radio detection and ranging (RADAR), and/or sound navigation and ranging (SONAR) that emit sound or electromagnetic radiation in the form of light or radio waves to generate return signals. The remote-detection sensors 109 may also include one or more passive sensors, such as cameras or other imaging sensors, proximity sensors, etc. that receive return signals that originated from other sources of sound or electromagnetic radiation. Information about the environment 100 is extracted from the return signals. In some examples, the remote-detection sensors 109 include one or more passive sensors that receive reflected ambient light or other radiation, such as a set of monoscopic or stereoscopic cameras. Remote-detection sensors 109 provide remote-sensor data that describes the environment 100.

The vehicle 102 may also include one or more additional sensors 111 that sense a motion, position, or other property of the vehicle 102. Example sensors 111 include inertial measurement units (IMU), inclinometers, odometers, various encoders, etc. Other example sensors 111 that may be present include positioning systems, such as global positioning systems (GPS), etc.

The center-of-mass system 118 generates center-of-mass data. Center-of-mass data describes values for the load center of mass generated by the center-of-mass system 118. In some examples, center-of-mass data also includes an indication that that the center-of-mass system has detected a load center-of-mass anomaly. The center-of-mass system 118, in some examples, stores center-of-mass data at a center-of-mass log 120, where it can be later retrieved and analyzed. In some examples, the center-of-mass system 118 provides center-of-mass data to the vehicle autonomy system 116. The vehicle autonomy system 116 responds to center-of-mass data by modifying the control inputs to the vehicle 102, as described herein. In some examples, the center-of-mass system 118 also generates alert data. Alert data indicates that a load center-of-mass anomaly has been detected. The alert data may be provided to a cab input/output device that alerts the user of the load center-of-mass anomaly. Alert data may also be transmitted to a host system for storage or analysis.

The center-of-mass system generates the center-of-mass data and/or alert data based on various different types of data including, for example, sensor data, control data, and pose data. Sensor data may include data from remote-detection sensors 109 and/or other sensors 111. In some examples, sensor data includes yaw data describing a yaw of the vehicle 102. The yaw data can be received, for example, from an accelerometer, an inclinometer, or other suitable sensor. The yaw of the vehicle 102 can change, for example, in response to steering input. Yaw data can describe a change in the yaw of the vehicle 102 and/or a rate at which the yaw of the vehicle 102 changes. For example, a yaw rate can be expressed in degrees per second or another suitable unit.

Control data describes control inputs provided to the vehicle 102 such as, for example, steering, braking, acceleration, etc. For example, control data may include steering input data that directly or indirectly indicates the steering angle. Pose data, as described herein, indicates a pose of the vehicle 102. The pose of the vehicle 102 describes the vehicle 102's position and attitude in three dimensional space. Position is indicated with three-dimensional spatial coordinates. Attitude, for example, is indicated by a roll, pitch, and yaw. Accordingly, pose data may include an indication of yaw. In some examples, a change in the yaw of the vehicle 102 and/or a yaw rate is determined from two or more vehicle poses. A yaw rate for the vehicle 102 can be determined by finding a change in the yaw of the vehicle 102 over time.

The center-of-mass system 118 determines the load center of mass based on the mass of the trailer 106 (e.g., the loaded mass of the trailer 106) and vehicle understeer. For example, consider the example of FIG. 1, where the vehicle 102 is level. In this example, the trailer 106 causes a load gravitational force 128 (called a load force 128 herein). The load force 128 can be considered to act at a position along a longitudinal axis 130 of the trailer 106 that corresponds to a load center of mass. The load force 128 contributes to a trailer rear axle force 126 at the tractor rear axle and a tractor rear axle force 124. The distribution of the load force 128 between the trailer rear axle force 126 and the tractor rear axle force 124 provides an indication of the load center of mass. The center-of-mass system 118, as described herein, derives the load contribution to the tractor rear axle force 124 by determining tractor understeer. Given the load contribution to the tractor rear axle force 124 and the mass of the trailer 106, the center-of-mass system 118 derives the load center of mass.

The center-of-mass system 118 determines the mass of the trailer 106 considering sensor data and control data. For example, sensor data and/or control data may be used to determine forces exerted on the vehicle 102 and the vehicle 102's acceleration. The center-of-mass system 118 finds vehicle acceleration data describing vehicle acceleration, for example, from an accelerometer or similar sensor and/or from successive vehicle 102 poses determined by the vehicle autonomy system 116.

From the forces and acceleration, the center-of-mass system 118 finds the mass of the vehicle 102, for example, using the Newtonian relationship between force, mass, and acceleration given by Equation [1] below, in which F is force, M is mass, and A is acceleration:

$$F = MA \quad [1]$$

From the mass of the vehicle 102, the center-of-mass system 118 determines the mass of the trailer 106, for example, considering the unloaded mass of the tractor 104, the mass of the fuel on board, the mass of a user or other occupant of the cab 108, etc.

The forces exerted on the vehicle 102 include, for example, an engine force provided by the engine (e.g., to drive wheels), a gravitational force, an aerodynamic drag force, etc. The center-of-mass system 118 determines the engine force, for example, utilizing sensor data that describes the current speed of the engine, e.g., in rotations per minute (RPM), control data indicating a current throttle position, and an engine/drivetrain torque map that maps different engine speeds and throttle positions to the resulting force applied at the drive wheels.

The center-of-mass system 118 determines gravitational force, for example, from sensor data indicating a pitch or slope of the vehicle 102. The pitch may be read from an inclinometer or similar sensor and/or may be determined from vehicle pose readings received from the vehicle autonomy system 116. If the vehicle 102 is not on a flat roadway, the center-of-mass system 118 finds a component of the gravitational force that is parallel to the roadway surface. The center-of-mass system 118 determines the force due to aerodynamic drag, for example, considering a velocity of the vehicle 102, an air density, wind speed and direction, and an aerodynamic profile of the vehicle 102, such as a drag coefficient. For example, aerodynamic drag may increase as air density divided by two and as velocity squared.

The center-of-mass system 118 finds some or all of the vehicle forces deterministically by applying input values to one or more equations for the various forces. Also, in some examples, the center-of-mass system 118 determines some or all of the vehicle forces utilizing a machine learning algorithm, Kalman filter, or similar algorithm. For example, a Kalman filter or suitable machine learning algorithm may receive input, such as vehicle mass, current fuel load, initial fuel load, fuel burn, throttle position, engine speed, etc., and return a total force on the vehicle 102 and/or one or more individual forces exerted on the vehicle 102.

The center-of-mass system 118 determines the understeer, for example, based on control data indicating the steering input and sensor and/or pose data indicating a change in yaw or change in yaw rate that results from the steering input. The control data indicates a steering input provided to a steering control system (FIG. 3) of the vehicle 102. The steering input directly or indirectly indicates a steering angle of the vehicle 102. The steering angle describes an angle by which the steering wheels deviate from straight. For example, view 121 in FIG. 1 shows a top-down view of the tractor 104 that illustrates an example steering angle 114. The view 121 is also cut-away to show the wheels of the tractor 104 and the steering angle 114. In the example of FIG. 1, the steering angle 114 is to the right. The steering wheels are in contact with a roadway surface to cause a frictional turning force 132 tending to push the front of the tractor 104 to the right. This causes the tractor 104 to rotate about a yaw axis 110 in the direction indicated by arrow 112. The change in vehicle yaw is the amount of rotation about the yaw axis 110. The yaw rate for the vehicle is the change in vehicle yaw per unit time. The vehicle understeer value generated by the center-of-mass system 118 uses a relationship between the steering angle 114 and the resulting change in yaw. For example, the center-of-mass system 118 may use a ratio of steering angle 114 and resulting change in yaw.

The understeer of the tractor 104 is related to a tractor front axle force 122 exerted on the steering wheels and to a tractor rear axle force 124 exerted on the rear axle or axles of the tractor 104. For example, the frictional turning force 132 is proportional to a product of a normal component of the tractor front axle force 122 and a coefficient of friction between the steering wheels and the roadway surface. The change in yaw brought about by the steering angle 114 depends on the steering force 132 and also on a frictional force provided by the wheels of the rear axle or axles. The frictional turning force 132 changes the yaw of the vehicle 102, at least in part, by sliding the wheels of the rear axle or axles across the roadway surface in the direction indicated by the arrow 112. Contact between the wheels of the rear axle and the roadway surface generates a counter frictional force 113 that is overcome to change the vehicle yaw. The value of the counter frictional force 113 is proportional to a normal component of the tractor rear axle force 124 and a coefficient of friction between the rear axle wheels and the roadway surface. In some examples, the tractor front axle force 122 and tractor rear axle force 124 depend on each other. For example, higher tractor rear axle forces 124 may cause the tractor 104 to rock back on its suspension, lessening the tractor front axle force 122 and increasing oversteer.

The center-of-mass system 118 exploits the relationships between vehicle understeer and the tractor rear axle force 124 to determine the load center of mass. In some examples, the center-of-mass system 118 executes a deterministic operation to relate understeer and load center of mass. The center-of-mass system 118 determines an understeer, where the understeer is based on the steering angle 114 and the resulting yaw rate or change in yaw. From the understeer, the center-of-mass system 118 determines values for the tractor front axle force 122 and the tractor rear axle force 124. The center-of-mass system 118 then determines a deviation from an expected weight distribution of the tractor 104. The expected weight distribution of the tractor 104 is a relationship between the forces 122, 124 that would be expected if the tractor 104 were unloaded (e.g., if the trailer 106 were not attached). The expected weight distribution, for example, may be found considering the weight of the tractor 104, the unloaded weight distribution of the tractor 104, etc. In some examples, the expected weight distribution also considers the fuel load of the tractor 104. From the deviation from the expected weight distribution of the tractor 104, the center-of-mass system 118 determines the load contribution to the tractor rear axle force 124. Given the load contribution to the tractor rear axle force 124 and the mass of the trailer 106, the center-of-mass system 118 determines a load center-of-mass value.

In some examples, the center-of-mass system 118 implements a machine learning algorithm, a Kalman filter, or similar algorithm, to determine load center of mass. For example, the center-of-mass system 118 may train the machine learning algorithm to return load center of mass given various inputs. Example inputs include the force exerted on the vehicle 102, the steering angle 114, the change in yaw, and/or the yaw rate.

Figure 2:
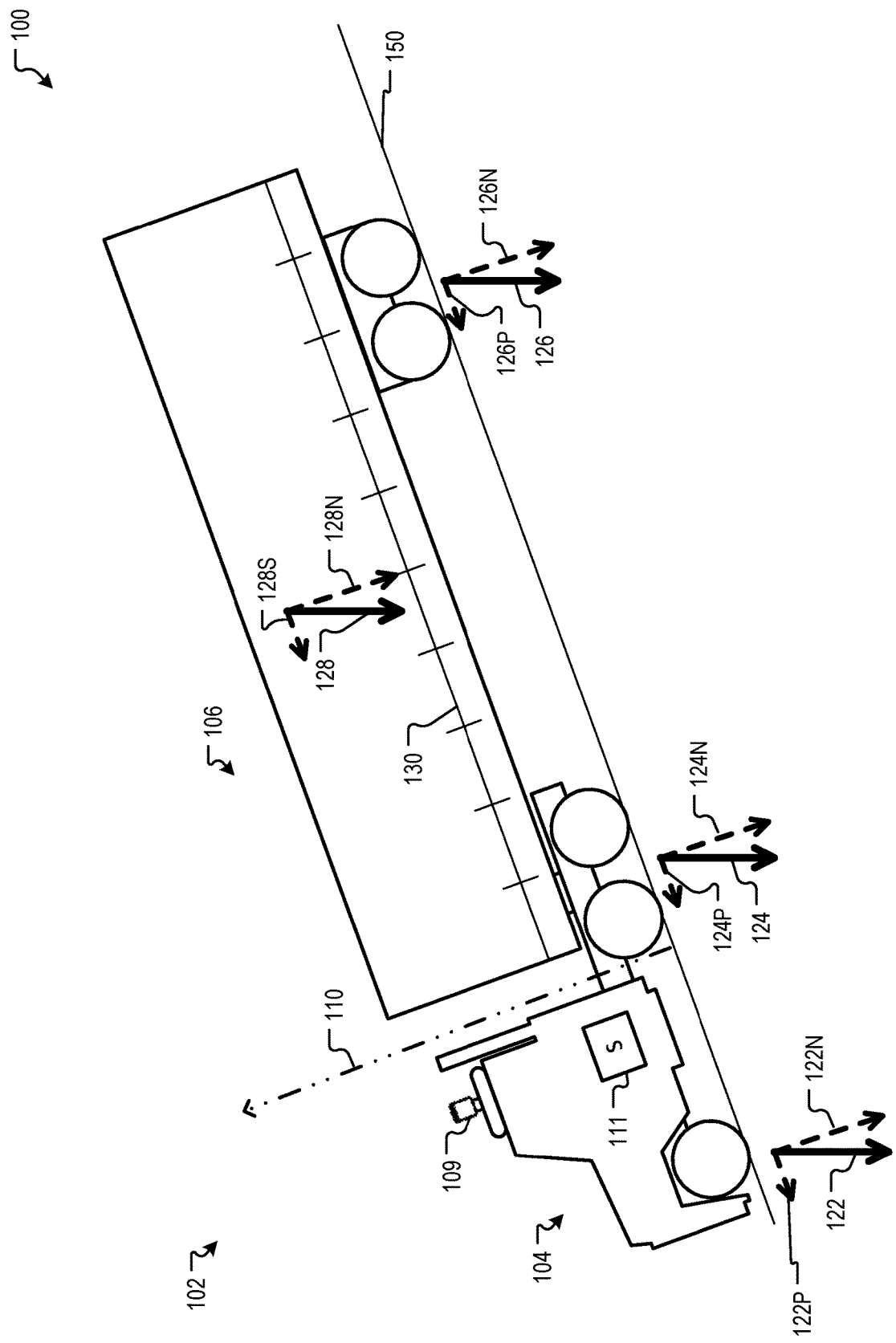
FIG. 2 shows another example of the environment of FIG. 1 in which the vehicle is on a roadway surface that is not level.

FIG. 1 shows a simplified example in which the vehicle 102 is on a flat roadway surface. Accordingly, forces 122, 124, 126, 128 are all normal to the roadway surface. In use, however, the vehicle 102 may travel on roadways that are not flat. FIG. 2 shows another example of the environment 100 in which the vehicle 102 is on a roadway surface 150 that is not level. In this example, the various forces 122, 124, 126, 128 can be expressed as a combination of respective parallel forces 122P, 124P, 126P, 128P and respective normal forces 122N, 124N, 126N, 128N. The center-of-mass system 118 considers the respective parallel and normal forces when determining load center of mass. For example, when determining the forces acting on the vehicle 102, parallel components 122P, 124P, 126P are not cancelled out by an opposite force provided by the ground. Accordingly, the center-of-mass system 118 may consider parallel components 122P, 124P, 126P when determining the trailer mass as described herein. Also, the frictional forces between the various wheels and the roadway surface 150 depend on the normal components 122N, 124N. Accordingly, the center-of-mass system 118 may consider normal components 122N, 124N when determining understeer and/or load center of mass as described herein.

As described herein, the load center of mass determined by the center-of-mass system 118 may be a loaded trailer center of mass that describes a combination of the trailer 106 and the load present on the trailer 106 or a trailer-independent center of mass. In examples in which the center-of-mass system 118 determines a trailer-independent center of mass, the center-of-mass system 118 removes the contribution of the trailer 106 to determine a load center of mass that describes the contents of the trailer 106 only. In some examples, the contribution of the trailer 106 is removed deterministically. For example, the center of mass of the trailer 106 (absent any load) may be known. Given the center of mass of the trailer 106 and mass of the trailer 106, the center-of-mass system 118 may back out a load center-of-mass that does not consider the trailer 106. In other examples, when a machine learning algorithm is used to determine load center of mass, the machine learning algorithm may be trained to return a trailer-independent center of mass.

Figure 3:
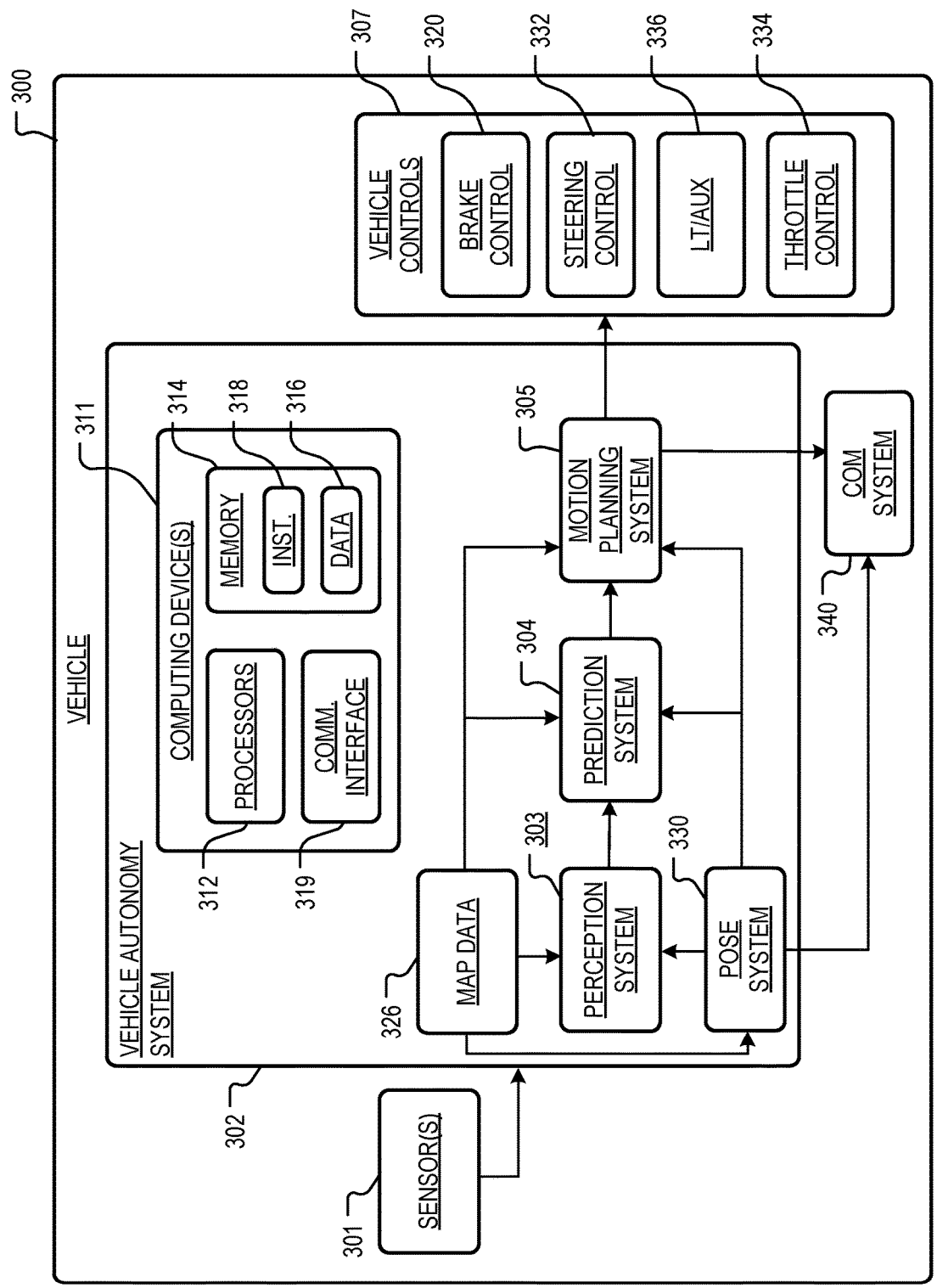
FIG. 3 depicts a block diagram of an example vehicle, according to example aspects of the present disclosure.

FIG. 3 depicts a block diagram of an example vehicle 300 according to example aspects of the present disclosure. Vehicle 300 can be, for example, an autonomous or semi-autonomous vehicle. The vehicle 300 includes one or more sensors 301, a vehicle autonomy system 302, and one or more vehicle controls 307. In some examples, the vehicle 300 includes a center-of-mass system 340, which may operate in a manner similar to that of the center-of-mass system 118 described in FIG. 1.

The vehicle autonomy system 302 can be engaged to control the vehicle 300 or to assist in controlling the vehicle 300. In particular, the vehicle autonomy system 302 receives sensor data from the one or more sensors 301, attempt to comprehend the environment 100 surrounding the vehicle 300 by performing various processing techniques on data collected by the sensors 301, and generate an appropriate motion path through the environment 100. The vehicle autonomy system 302 can control the one or more vehicle controls 307 to operate the vehicle 300 according to the motion path.

The vehicle autonomy system 302 includes a perception system 303, a prediction system 304, a motion planning system 305, and a pose system 330 that cooperate to perceive the surrounding environment 100 of the vehicle 300 and determine a motion plan for controlling the motion of the vehicle 300 accordingly. The pose system 330 may be arranged to operate as described herein.

Various portions of the vehicle autonomy system 302 receive sensor data from the one or more sensors 301. For example, the sensors 301 may include remote-detection sensors 109 as well as motion sensors such as an inertial measurement unit (IMU), one or more encoders, one or more odometers, etc. The sensor data can include information that describes the location of objects within the surrounding environment 100 of the vehicle 300, information that describes the motion of the vehicle 300, etc.

The sensors 301 may also include one or more remote-detection sensors 109 or sensor systems, such as a LIDAR, a RADAR, one or more cameras, etc. As one example, a LIDAR system of the one or more sensors 301 generates sensor data (e.g., remote-sensor data) that includes the location (e.g., in three-dimensional space relative to the LIDAR system) of a number of points that correspond to objects that have reflected a ranging laser. For example, the LIDAR system can measure distances by measuring the time of flight (TOF) that it takes a short laser pulse to travel from the sensor to an object and back, calculating the distance from the known speed of light.

As another example, a RADAR system of the one or more sensors 301 generates sensor data (e.g., remote-sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 301 may generate sensor data (e.g., remote-sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 301 can include a positioning system. The positioning system can determine a current position of the vehicle 300. The positioning system can be any device or circuitry for analyzing the position of the vehicle 300. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the vehicle 300 can be used by various systems of the vehicle autonomy system 302.

Thus, the one or more sensors 301 can be used to collect sensor data that includes information that describes the location (e.g., in three-dimensional space relative to the vehicle 300) of points that correspond to objects within the surrounding environment 100 of the vehicle 300. In some implementations, the sensors 301 can be located at various different locations on the vehicle 300. As an example, in some implementations, one or more cameras and/or LIDAR sensors can be located in a pod or other structure that is mounted on a roof of the vehicle 300 while one or more RADAR sensors can be located in or behind the front and/or rear bumper(s) or body panel(s) of the vehicle 300. As another example, camera(s) can be located at the front or rear bumper(s) of the vehicle 300 as well. Other locations can be used as well.

The pose system 330 receives some or all of the sensor data from sensors 301 and generates vehicle poses for the vehicle 300. A vehicle pose describes the position and attitude of the vehicle 300. The position of the vehicle 300 is a point in a three dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis and a roll about a second horizontal axis. In some examples, the pose system 330 generates vehicle poses periodically (e.g., every second, every half second, etc.) The pose system 330 appends time stamps to vehicle poses, where the time stamp for a pose indicates the point in time that is described by the pose. The pose system 330 generates vehicle poses by comparing sensor data (e.g., remote-sensor data) to map data 326 describing the surrounding environment 100 of the vehicle 300.

In some examples, the pose system 330 includes one or more localizers and a pose filter. Localizers generate pose estimates by comparing remote-sensor data (e.g., LIDAR, RADAR, etc.) to map data 326. The pose filter receives pose estimates from the one or more localizers as well as other sensor data such as, for example, motion sensor data from an IMU, encoder, odometer, etc. In some examples, the pose filter executes machine learning algorithm, a Kalman filter or other similar algorithm to combine pose estimates from the one or more localizers with motion sensor data to generate vehicle poses. In some examples, localizers generate pose estimates at a frequency less than the frequency at which the pose system 330 generates vehicle poses. Accordingly, the pose filter generates some vehicle poses by extrapolating from a previous pose estimate utilizing motion sensor data.

The perception system 303 detects objects in the surrounding environment 100 of the vehicle 300 based on sensor data, map data 326 and/or vehicle poses provided by the pose system 330. Map data 326, for example, may provide detailed information about the surrounding environment 100 of the vehicle 300. The map data 326 can provide information regarding: the identity and location of different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the vehicle autonomy system 302 in comprehending and perceiving its surrounding environment 100 and its relationship thereto. A roadway may be a place where the vehicle 300 can drive and may include, for example, a road, a street, a highway, a lane, a parking lot, a driveway, etc. The perception system 303 may utilize vehicle poses provided by the pose system 330 to place the vehicle 300 within the map data 326 and thereby predict which objects should be in the vehicle 300's surrounding environment 100.

In some examples, the perception system 303 determines state data for one or more of the objects in the surrounding environment 100 of the vehicle 300. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle 300 versus pedestrian versus bicycle versus other); yaw rate; distance from the vehicle 300; minimum path to interaction with the vehicle 300; minimum time duration to interaction with the vehicle 300; and/or other state information.

In some implementations, the perception system 303 can determine state data for each object over a number of iterations. In particular, the perception system 303 can update the state data for each object at each iteration. Thus, the perception system 303 can detect and track objects, such as vehicles, that are proximate to the vehicle 300 over time.

The prediction system 304 is configured to predict one or more future positions for an object or objects in the environment 100 surrounding the vehicle 300 (e.g., an object or objects detected by the perception system 303). The prediction system 304 can generate prediction data associated with one or more of the objects detected by the perception system 303. In some examples, the prediction system 304 generates prediction data describing each of the respective objects detected by the prediction system 304.

Prediction data for an object can be indicative of one or more predicted future locations of the object. For example, the prediction system 304 may predict where the object will be located within the next 5 seconds, 20 seconds, 200 seconds, etc. Prediction data for an object may indicate a predicted trajectory (e.g., predicted path) for the object within the surrounding environment 100 of the vehicle 300. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the pose system 330 and/or map data 326.

In some examples, the prediction system 304 uses state data indicative of an object type or classification to predict a trajectory for the object. As an example, the prediction system 304 can use state data provided by the perception system 303 to determine that particular object (e.g., an object classified as a vehicle 300) approaching an intersection and maneuvering into a left-turn lane intends to turn left. In such a situation, the prediction system 304 can predict a trajectory (e.g., path) corresponding to a left-turn for the vehicle 300 such that the vehicle 300 turns left at the intersection. Similarly, the prediction system 304 can determine predicted trajectories for other objects, such as bicycles, pedestrians, parked vehicles, etc. The prediction system 304 can provide the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 determines a motion plan for the vehicle 300 based, at least in part, on the predicted trajectories associated with the objects within the surrounding environment 100 of the vehicle 300, the state data for the objects provided by the perception system 303, vehicle poses provided by the pose system 330, and/or map data 326. Stated differently, given information about the current locations of objects and/or predicted trajectories of objects within the surrounding environment 100 of the vehicle 300, the motion planning system 305 can determine a motion plan for the vehicle 300 that best navigates the vehicle 300 relative to the objects at such locations and their predicted trajectories on acceptable roadways.

In some implementations, the motion planning system 305 can evaluate one or more cost functions and/or one or more reward functions for each of one or more candidate motion plans for the vehicle 300. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 305 can determine a total cost (e.g., a sum of the cost(s) and/or reward(s) provided by the cost function(s) and/or reward function(s)) of adhering to a particular candidate pathway. The motion planning system 305 can select or determine a motion plan for the vehicle 300 based, at least in part, on the cost function(s) and the reward function(s). For example, the motion plan that minimizes the total cost can be selected or otherwise determined. The motion plan can be, for example, a path along which the vehicle 300 will travel in one or more forthcoming time periods. In some implementations, the motion planning system 305 can be configured to iteratively update the motion plan for the vehicle 300 as new sensor data is obtained from one or more sensors 301. For example, as new sensor data is obtained from one or more sensors 301, the sensor data can be analyzed by the perception system 303, the prediction system 304, and the motion planning system 305 to determine the motion plan.

Each of the perception system 303, the prediction system 304, the motion planning system 305, and the pose system 330, can be included in or otherwise comprise a part of a vehicle autonomy system 302 configured to determine a motion plan based, at least in part, on data obtained from one or more sensors 301. For example, data obtained by one or more sensors 301 can be analyzed by each of the perception system 303, the prediction system 304, and the motion planning system 305 in a consecutive fashion in order to develop the motion plan. While FIG. 3 depicts elements suitable for use in a vehicle autonomy system 302, according to example aspects of the present disclosure, one of ordinary skill in the art will recognize that other vehicle autonomy systems can be configured to determine a motion plan for an autonomous vehicle based on sensor data.

The motion planning system 305 can provide the motion plan to one or more vehicle controls 307 to execute the motion plan. For example, the one or more vehicle controls 307 can include throttle systems, brake systems, steering systems, and other control systems, each of which can include various vehicle controls 307 (e.g., actuators or other devices that control gas flow, steering, braking, etc.) to control the motion of the vehicle 300. The various controls 307 can include one or more controllers, control devices, motors, and/or processors.

The vehicle controls 307 can include a brake control module 320. The brake control module 320 is configured to receive all or part of the motion plan and generate a braking command that applies (or does not apply) the vehicle brakes. In some examples, the brake control module 320 includes a primary system and a secondary system. The primary system may receive braking commands and, in response, brake the vehicle 300. The secondary system may be configured to determine a failure of the primary system to brake the vehicle 300 in response to receiving the braking command.

A steering control system 332 is configured to receive all or part of the motion plan and generate a steering command. The steering command is provided to a steering system to provide a steering input to steer the vehicle 300. A lighting/auxiliary control module 336 may receive a lighting or auxiliary command. In response, the lighting/auxiliary control module 336 may control a lighting and/or auxiliary system of the vehicle 300. Controlling a lighting system may include, for example, turning on, turning off, or otherwise modulating headlights, parking lights, running lights, etc. Controlling an auxiliary system may include, for example, modulating windshield wipers, a defroster, etc.

A throttle control system 334 is configured to receive all or part of the motion plan and generate a throttle command. The throttle command is provided to an engine and/or engine controller, or other propulsion system component to control the engine or other propulsion system of the vehicle 300.

The vehicle autonomy system 302 includes one or more computing devices, such as the computing device 311, which may implement all or parts of the perception system 303, the prediction system 304, the motion planning system 305 and/or the pose system 330. The example computing device 311 can include one or more processors 312 and one or more memory devices (collectively referred to as memory) 314. The one or more processors 312 can be any suitable processing device (e.g., a processor core, a microprocessor, an application specific integrated circuit (ASIC), an field programmable gate array (FPGA), a microcontroller, etc.) and can be one processor or a plurality of processors 312 that are operatively connected. The memory 314 can include one or more non-transitory computer-readable storage mediums, such as random access memory (RAM), read only memory (ROM), electrically erasable programmable read only memory (EEPROM), erasable programmable read only memory (EPROM), flash memory devices, magnetic disks, etc., and combinations thereof. The memory 314 can store data 316 and instructions 318 which can be executed by the processor 312 to cause the vehicle autonomy system 302 to perform operations. The one or more computing devices 311 can also include a communication interface 319, which can allow the one or more computing devices 311 to communicate with other components of the vehicle 300 or external computing systems, such as via one or more wired or wireless networks. Additional descriptions of hardware and software configurations for computing devices, such as the computing device(s) 311 are provided herein at FIGS. 11 and 12.

Figure 4:
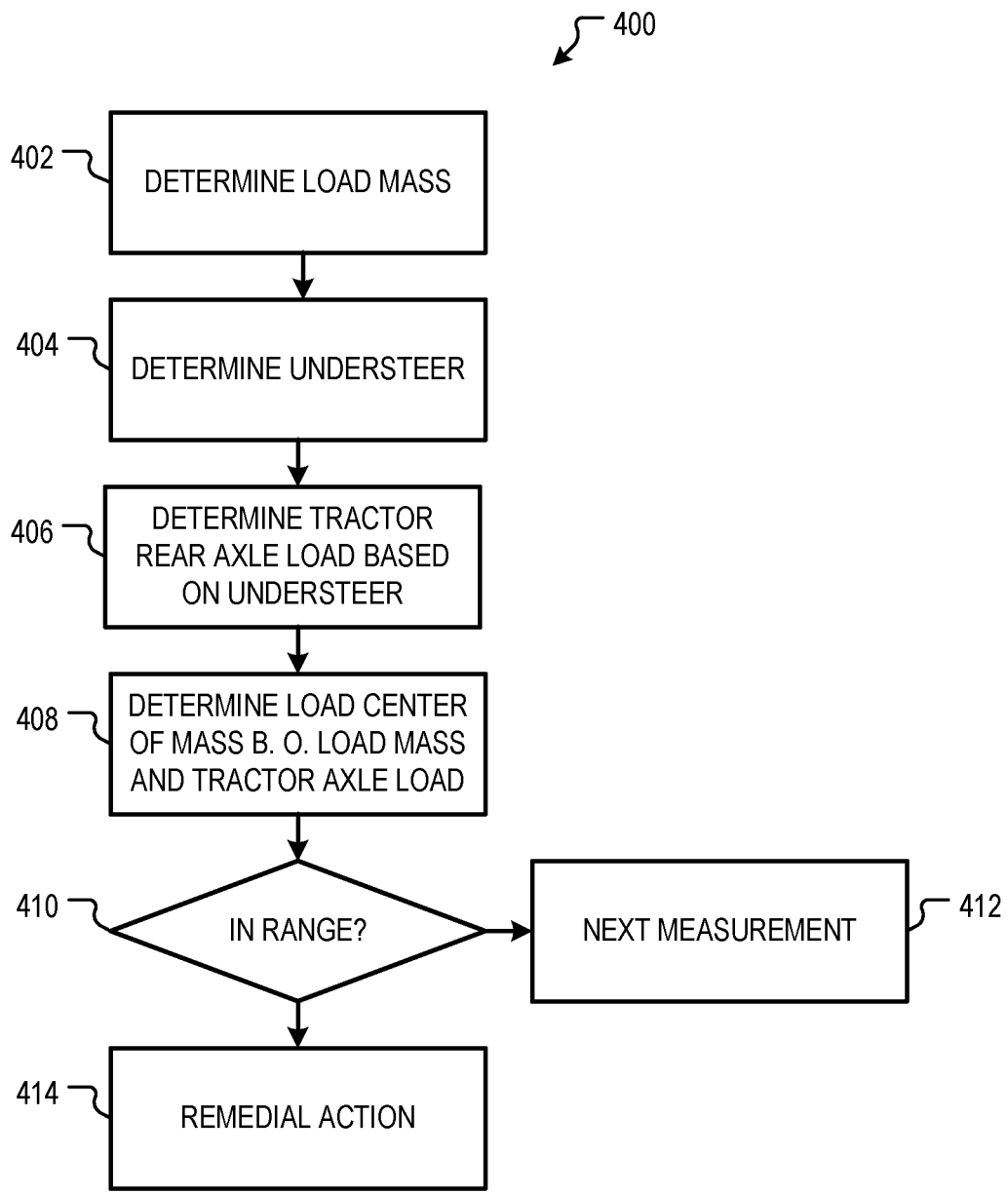
FIG. 4 is a flow chart showing one example of a process flow that may be executed at a vehicle, such as the vehicle of FIG. 1, to determine and use a load center of mass.

FIG. 4 is a flow chart showing one example of a process flow 400 that may be executed at a vehicle, such as the vehicle 102 of FIG. 1, to determine and use a load center of mass. In some examples, the process flow 400 is executed by the center-of-mass system 118.

At operation 402, the center-of-mass system 118 determines a loaded trailer mass. The loaded trailer mass is the mass of the trailer 106 plus the mass of any cargo loaded in the trailer 106. The center-of-mass system 118 may determine the load mass in any suitable manner. In some examples, the center-of-mass system 118 determines the load mass by finding the total mass of the vehicle 102. For example, the center-of-mass system 118 determines the acceleration of the vehicle 102 (e.g., from motion sensors, the pose system 330, etc.), and the forces on the vehicle 102 (e.g., due to gravity, engine torque, etc.). The center-of-mass system 118 then finds the total mass of the vehicle 102 utilizing a known relationship between force, mass, and acceleration, such as the Newtonian relationship described by Equation [1] above. An example way that the center-of-mass system 118 may determine the load mass is described herein with respect to FIG. 5.

At operation 404, the center-of-mass system 118 determines the understeer experienced by the vehicle 102. For example, the center-of-mass system 118 may measure the vehicle 102's steering angle 114 and a resulting change in yaw or yaw rate. In some examples, the relationship between steering angle 114 and yaw is described as an understeer gradient. The understeer gradient describes the change in yaw and/or a yaw rate that results from a corresponding steering angle 114. An example way that the center-of-mass system 118 may determine the understeer is described herein with respect to FIG. 6.

At operation 406, the center-of-mass system 118 determines the tractor rear axle force 124 using the understeer determined at operation 404. Understeer is correlated to rear axle force 124 of the tractor 104. A higher rear axle force 124 may cause or be the result of the tractor 104 rocking back on its suspension. This may tend to reduce the normal force on the front axle wheels, decreasing friction between the front axle wheels and the road surface and, thereby, increasing understeer. Also, a higher rear axle force 124 increases the normal force between the rear axle tires and the road surface, thereby increasing the counter-frictional force 113 and, accordingly, increasing understeer. The center-of-mass system 118 may determine the rear axle force 124 from the understeer in any suitable manner. For example, the center-of-mass system 118, in some examples, determines the rear axle force 124 from understeer deterministically based on mathematical relationships between the understeer and the force 124 on the rear axles or axles. In other examples, the center-of-mass system 118 determines the rear axle force 124 by extrapolating from data gathered from observations, for example, utilizing a machine learning algorithm, Kalman filter, or other suitable algorithm.

At operation 408, the center-of-mass system 118 determines the load center of mass using the load mass determined at operation 402 and the tractor rear axle force 124 determined at operation 406. The center-of-mass system 118 may determine a contribution to the rear axle force 124 from the trailer 106 given the mass of the trailer 106 and the mass of the tractor 104. For example, the mass of the tractor 104 and the un-loaded weight distribution of the tractor 104 may be known. From these values, the center-of-mass system 118 may determine the portion of the tractor rear axle force 124 that is contributed by the trailer 106. Given the load mass determined at operation 402, the center-of-mass system 118 derives the load center of mass by comparing the portion of the load mass that contributes to the tractor rear axle load 124 to the total load mass. In some examples, the center-of-mass system 118 removes a known weight and/or center of mass of the unloaded trailer 106 to find a load center of mass that is independent of the trailer 106.

At operation 410, the center-of-mass system 118 determines whether the load center of mass determined at operation 408 transgresses a center-of-mass threshold, as described herein. For example, the center-of-mass system 118 may compare the load center of mass to a front threshold and/or a rear threshold. If the load center of mass is within a front threshold of the front of the trailer 106 and/or within a rear threshold of a rear of the trailer 106, then the load center of mass transgresses a center-of-mass threshold. In another example, if the load center of mass differs from a previous load center of mass by more than a threshold amount, then the load center of mass transgresses a center-of-mass threshold. Also, in another example, the center-of-mass system 118 determines if the load center of mass, in view of the loaded trailer mass determined at operation 402, results in more than a permissible amount of weight on an axle of the vehicle 102.

If the load center of mass does not transgress a center-of-mass threshold, the center-of-mass system 118 proceeds to its next measurement at operation 412. If the load center of mass does transgress a threshold, then the center of mass system 118 executes a remedial action, as described herein, at operation 414.

Figure 5:
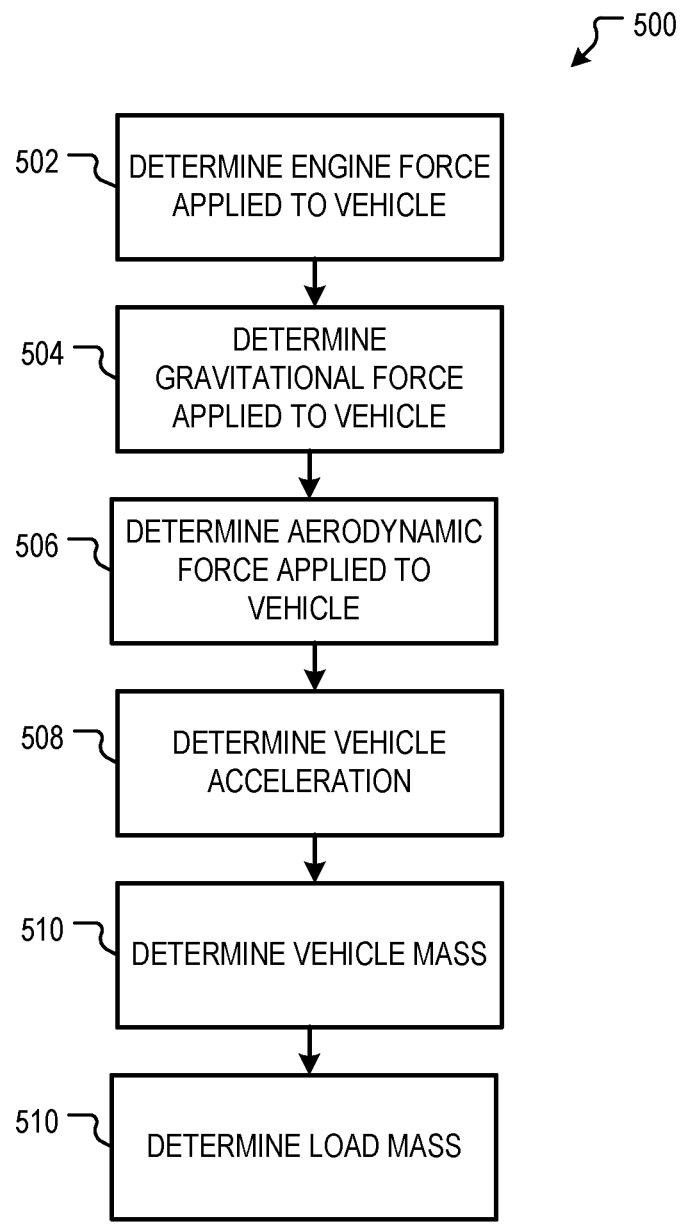
FIG. 5 is a flow chart showing one example of a process flow that may be executed at a vehicle, such as the vehicle of FIG. 1, to determine mass of the trailer.

FIG. 5 is a flow chart showing one example of a process flow 500 that may be executed at a vehicle, such as the vehicle 102 of FIG. 1, to determine mass of the trailer 106. For example, the process flow 500 may be executed by the center-of-mass system 118.

At operation 502, the center-of-mass system 118 determines the engine force applied to the vehicle 102. The engine force may be determined, for example, based on a throttle command provided to the throttle. The throttle command may be received from the vehicle autonomy system 302 and/or an engine controller that receives the throttle command signal provided by the user's modulation of the throttle pedal. The center-of-mass system 118 (or other suitable vehicle system) may apply engine map data with the throttle command to derive a torque provided by the engine to the wheels. The torque relates to the force provided to the vehicle 102 by the engine. In some examples, the center-of-mass system 118 assumes that all of the torque provided by the engine is applied to the vehicle 102 as engine force. In other examples, the center-of-mass system 118 measures and/or approximates wheel spin and generates the engine force using both the engine torque and the actual or approximated wheel spin.

At operation 504, the center-of-mass system 118 determines the gravitational force applied to the vehicle 102. The center-of-mass system 118 finds or determines a slope of the vehicle 102. The slope may be determined, from a motion sensor, and/or from the change in the altitude of pose estimates generated by the pose system 330 over time, or in another suitable way. From the slope of the vehicle 102, the center-of-mass system 118 determines the gravitational force on the vehicle 102 that is parallel to the roadway surface 150. This parallel gravitational force contributes to the vehicle 102's acceleration along the roadway.

At operation 506, the center-of-mass system 118 determines an aerodynamic force applied to the vehicle 102. The aerodynamic force may be determined, for example, using a drag coefficient for the vehicle 102, which may be known, and the velocity of the vehicle 102.

At operation 508, the center-of-mass system 118 determines the vehicle 102's acceleration. Vehicle acceleration may be determined, for example, from one or more accelerometers or other suitable motion sensors. In some examples, the vehicle 102's acceleration is determined from a set of pose estimates generated by the pose system 330. Also, in some examples, the vehicle 102's acceleration is determined from changes in the vehicle 102's pose estimates generated by the pose system 330.

At operation 510, the center-of-mass system 118 determines the vehicle 102's mass. The vehicle mass may be determined as described herein using Newtonian or other suitable laws of motion. At operation 510, the center-of-mass system 118 determines the loaded trailer mass. For example, the center-of-mass system 118 may subtract a known weight of the tractor 104 from the total mass of the vehicle 102.

Figure 6:
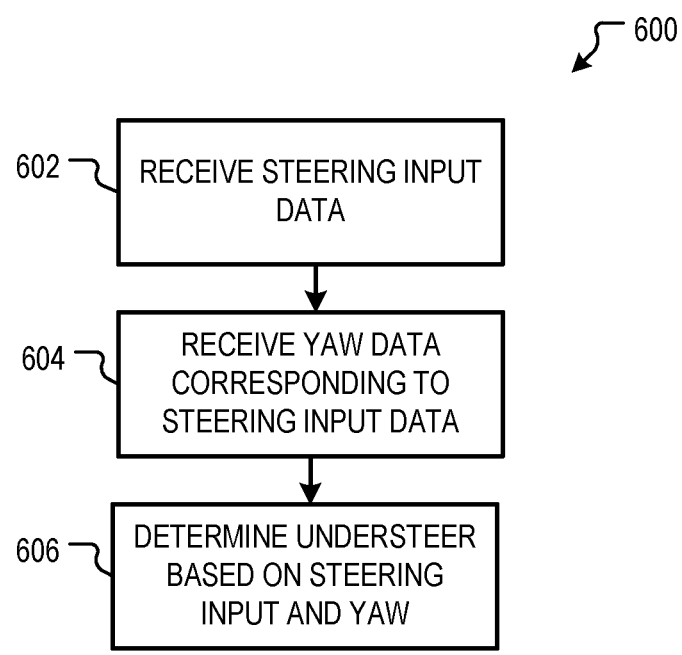
FIG. 6 is a flow chart showing one example of a process flow that may be executed at a vehicle, such as the vehicle of FIG. 1, to determine a vehicle understeer.

FIG. 6 is a flow chart showing one example of a process flow 600 that may be executed at a vehicle, such as the vehicle 102 of FIG. 1, to determine a vehicle understeer. For example, the process flow 600 may be executed by the center-of-mass system 118. At operation 602, the center-of-mass system 118 receives steering input data describing the steering angle 114 of the vehicle 102. Steering input data may be received from any suitable source. In some examples, an encoder or other suitable sensor is positioned on the steering shaft, rack, or other component of the vehicle 102's steering system. The steering input data includes an output of the sensor indicating steering angle 114. In some examples, the steering input data includes a steering command generated by a steering control system 332.

At operation 604, the center-of-mass system 118 receives yaw data corresponding to (e.g., captured near the same time as) the steering input data. The yaw data may be received, for example, from the pose system 330. At operation 606, the center-of-mass system 118 generates understeer data using the steering input data and the yaw data. For example, the center-of-mass system 118 determines a relationship between steering input values and resulting changes in yaw. This can include finding a relationship between steering input values and resulting yaw rates for the vehicle 102.

Figure 7:
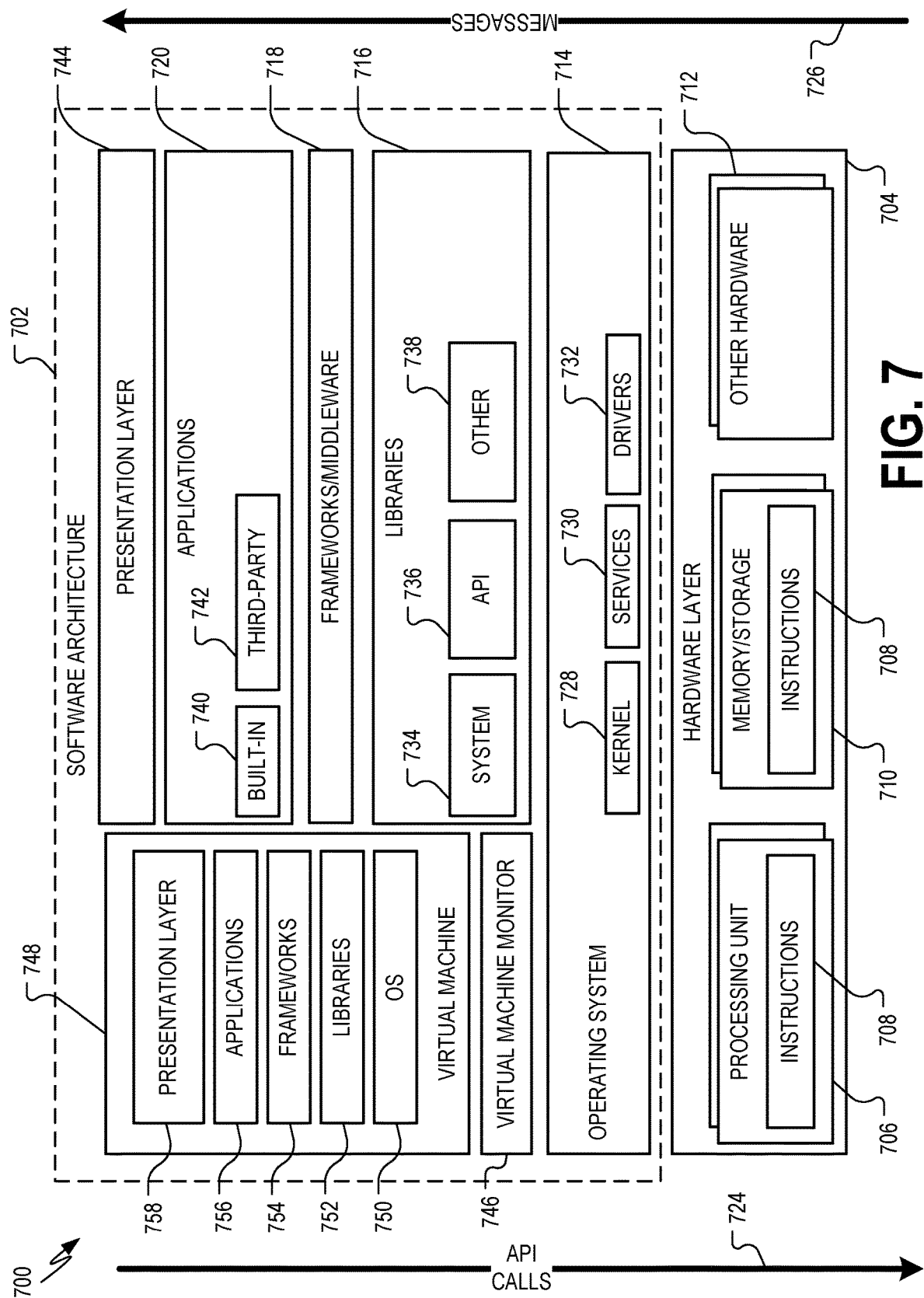
FIG. 7 is a block diagram showing one example of a software architecture for a computing device.

FIG. 7 is a block diagram 700 showing one example of a software architecture 702 for a computing device 311. The software architecture 702 may be used in conjunction with various hardware architectures, for example, as described herein. FIG. 7 is merely a non-limiting example of a software architecture 702 and many other architectures may be implemented to facilitate the functionality described herein. A representative hardware layer 704 is illustrated and can represent, for example, any of the above-referenced computing devices 311. In some examples, the hardware layer 704 may be implemented according to an architecture 800 of FIG. 8.

The representative hardware layer 704 comprises one or more processing units 706 having associated executable instructions 708. The executable instructions 708 represent the executable instructions of the software architecture 702, including implementation of the methods, modules, components, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the architecture 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke API calls 724 through the software stack and receive a response, returned values, and so forth illustrated as messages 726 in response to the API calls 724. The layers illustrated are representative in nature and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the software architecture 702 to pause its current processing and execute an interrupt service routine (ISR) when an interrupt is received. The ISR may generate an alert.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), WiFi® drivers, near field communication (NFC) drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be used by the applications 720 and/or other software components/modules. For example, the frameworks 718 may provide various graphical user interface (GUI) functions, high-level resource management, high-level location services, and so forth. The frameworks 718 may provide a broad spectrum of other APIs that may be used by the applications 720 and/or other software components/modules, some of which may be specific to a particular operating system 714 or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android® or iOS™ software development kit (SDK) by an entity other than the vendor of the particular platform) may be mobile software running on a mobile operating system such as iOS™, Android™, Windows® Phone, or other computing device operating systems. In this example, the third-party application 742 may invoke the API calls 724 provided by the mobile operating system such as the operating system 714 to facilitate functionality described herein.

The applications 720 may use built-in operating system functions (e.g., kernel 728, services 730, and/or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 7, this is illustrated by a virtual machine 748. A virtual machine 748 creates a software environment where applications/modules can execute as if they were executing on a hardware computing device 311. The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Figure 8:
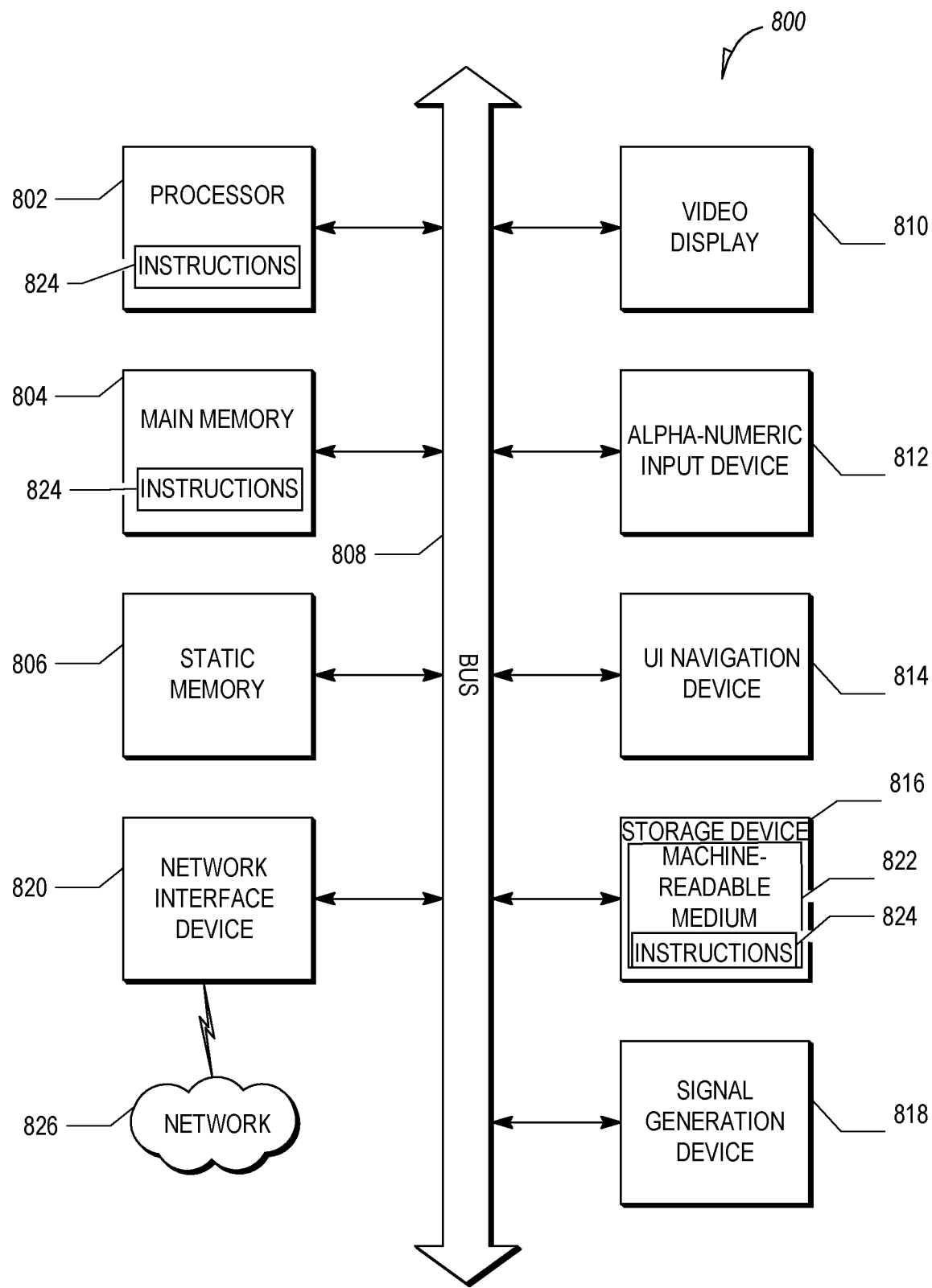
FIG. 8 is a block diagram illustrating a computing device hardware architecture, within which a set or sequence of instructions can be executed to cause a machine to perform examples of any one of the methodologies discussed herein.

FIG. 8 is a block diagram illustrating a computing device hardware architecture 800, within which a set or sequence of instructions 708 can be executed to cause a machine to perform examples of any one of the methodologies discussed herein. The architecture 800 may describe a computing device 311 for executing the vehicle autonomy system 302, center-of mass system 340, etc. described herein.

The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions 708 (sequential or otherwise) that specify operations to be taken by that machine.

The example architecture 800 includes a processor unit 802 comprising at least one processor unit (e.g., a central processing unit (CPU), a graphics processing unit (GPU), or both, processor cores, compute nodes, etc.). The architecture 800 may further comprise a main memory 804 and a static memory 806, which communicate with each other via a link 808 (e.g., bus). The architecture 800 can further include a video display unit 810, an input device 812 (e.g., a keyboard), and a UI navigation device 814 (e.g., a mouse). In some examples, the video display unit 810, input device 812, and UI navigation device 814 are incorporated into a touchscreen display. The architecture 800 may additionally include a storage device 816 (e.g., a drive unit), a signal generation device 818 (e.g., a speaker), a network interface device 820, and one or more sensors 301 (not shown), such as a Global Positioning System (GPS) sensor, compass, accelerometer, or other sensor.

In some examples, the processor unit 802 or another suitable hardware component may support a hardware interrupt. In response to a hardware interrupt, the processor unit 802 may pause its processing and execute an ISR, for example, as described herein.

The storage device 816 includes a machine-readable medium 822 on which is stored one or more sets of data structures and instructions 824 (e.g., software) embodying or used by any one or more of the methodologies or functions described herein. The instructions 824 can also reside, completely or at least partially, within the main memory 804, within the static memory 806, and/or within the processor unit 802 during execution thereof by the architecture 800, with the main memory 804, the static memory 806, and the processor unit 802 also constituting machine-readable media 822.

Executable Instructions and Machine-Storage Medium

The various memories (i.e., 804, 806, and/or memory of the processor unit(s) 802) and/or storage device 816 may store one or more sets of instructions and data structures (e.g., instructions) 824 embodying or used by any one or more of the methodologies or functions described herein. These instructions 824, when executed by processor unit(s) 802 cause various operations to implement the disclosed examples.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions 824 and/or data, as well as cloud-based storage systems or storage networks that include multiple storage apparatus or devices. The terms shall accordingly be taken to include, but not be limited to, solid-state memories, and optical and magnetic media, including memory internal or external to processors 802. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 can further be transmitted or received over a communications network 826 using a transmission medium via the network interface device 820 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions 824 for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device 311 may be configured with suitable software instructions 824 that program the computing device 311. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A computer-implemented system for controlling a vehicle comprising a tractor and a trailer coupled to the tractor, the system comprising:
   at least one processor programmed to perform operations comprising:
   obtaining a mass of the trailer;
   obtaining a steering response of the tractor;
   determining a center-of-mass associated with the trailer based at least in part on the steering response of the tractor and the mass of the trailer;
   determining a control input for the tractor, wherein determining the control input is based at least in part on the center-of-mass; and
   applying the control input to the tractor.

2. The system of claim 1, the operations further comprising determining, by the at least one processor, that the center-of-mass fails to satisfy a center-of-mass threshold.

3. The system of claim 2, the operations further comprising sending an alert message indicating that the center-of-mass fails to satisfy the center-of-mass threshold.

4. The system of claim 3, wherein the alert message is sent to an output device at a cab of the tractor.

5. The system of claim 3, wherein the alert message is sent to a remote host system.

6. The system of claim 1, the operations further comprising determining the steering response based at least in part on steering angle data describing a steering angle of the tractor, and yaw data describing a yaw rate of the tractor.

7. The system of claim 1, the operations further comprising determining a difference between the center-of-mass and a previous center-of-mass measured at a different time.

8. The system of claim 1, the operations further comprising determining a distance between the center-of-mass and a rear of the trailer.

9. The system of claim 1, the operations further comprising determining a distance between the center-of-mass and a front of the trailer.

10. The system of claim 1, the operations further comprising stopping the vehicle, wherein the stopping of the vehicle comprises the applying of the control input to the tractor.

11. The system of claim 1, wherein applying the control input to the tractor comprises causing the tractor to reduce a speed of the vehicle.

12. The system of claim 1, the operations further comprising determining, by the at least one processor, a tractor rear axle force based, at least in part, on the steering response of the tractor, wherein the determining of the center-of-mass also uses the tractor rear axle force.

13. The system of claim 1, the operations further comprising:
   obtaining, by the at least one processor, an engine force applied to the vehicle by an engine of the tractor;
   obtaining, by the at least one processor, a gravitational force applied to the vehicle; and
   accessing, by the at least one processor, acceleration data describing an acceleration of the vehicle, wherein the mass of the trailer is determined based at least in part on the acceleration, the engine force, and the gravitational force.

14. A method of operating a vehicle comprising a tractor and a trailer coupled to the tractor, the method comprising:
   obtaining, by at least one processor, a mass of the trailer;
   obtaining, by the at least one processor, a steering response of the tractor;
   determining, by the at least one processor, a center-of-mass associated with the trailer based at least in part on the steering response of the tractor and the mass of the trailer;
   determining, by the at least one processor, a control input for the tractor, wherein determining the control input is based at least in part on the center-of-mass; and
   applying, by the at least one processor, the control input to the tractor.

15. The method of claim 14, further comprising determining, by the at least one processor, that the center-of-mass fails to satisfy a center-of-mass threshold.

16. The method of claim 14, further comprising determining the steering response based at least in part on steering angle data describing a steering angle of the tractor, and yaw data describing a yaw rate of the tractor.

17. The method of claim 14, further comprising stopping the vehicle, wherein the stopping of the vehicle comprises the applying of the control input to the tractor.

18. The method of claim 14, wherein applying the control input to the tractor comprises causing the tractor to reduce a speed of the vehicle.

19. The method of claim 14, further comprising determining, by the at least one processor, a tractor rear axle force based, at least in part, on the steering response of the tractor, wherein the determining of the center-of-mass also uses the tractor rear axle force.

20. A computer-readable storage medium comprising instructions thereon that, when executed by at least one processor, causes the at least one processor to perform operations comprising:
   obtaining a mass of a trailer attached for pulling behind a tractor;

obtaining a steering response of the tractor;
determining a center-of-mass associated with the trailer based at least in part on the steering response of the tractor and the mass of the trailer;
determining a control input for the tractor, wherein determining the control input is based at least in part on the center-of-mass; and
applying the control input to the tractor.

* * * * *